United States Patent
Harvey

[15] 3,636,845
[45] Jan. 25, 1972

[54] PHOTOGRAPHIC FILM UNIT ASSEMBLAGE

[72] Inventor: Donald M. Harvey, Webster, N.Y.
[73] Assignee: Eastman Kodak Company, Rochester, N.Y.
[22] Filed: Oct. 2, 1970
[21] Appl. No.: 77,512

[52] U.S. Cl. .................................... 95/13, 95/19, 96/76
[51] Int. Cl. .................................................. G03d 17/52
[58] Field of Search .......................... 95/13, 19, 22; 96/76

[56] References Cited

UNITED STATES PATENTS

| | | | |
|---|---|---|---|
| 1,054,691 | 3/1913 | Hopkins | 95/22 |
| 2,558,856 | 7/1951 | Land | 96/76 X |
| 3,270,642 | 9/1966 | Nerwin | 95/13 |
| 3,582,335 | 6/1971 | Erlichman | 95/19 X |

Primary Examiner—John M. Horan
Assistant Examiner—Alan A. Mathews
Attorney—Robert W. Hampton and William C. Dixon, III

[57] ABSTRACT

An improved assemblage of integral self-processing film units interconnected by a unit-transporting web is disclosed wherein the length of web material between succeeding film units is approximately one-half the length of web material found between such units in prior assemblages of this type. The assemblage is adaptable to being arranged with its film units stacked in superposed relationship while being operably interconnected by the unit-transporting web for ready use in cooperating photographic apparatus. When the film units are so stacked, each unit in the stack is connected by the interconnecting web from a point that is located along the length of that unit forward of its trailing end, such as its midpoint or its leading end or a point forward of its leading end, to the leading end of the next succeeding unit immediately below that unit.

24 Claims, 28 Drawing Figures

DONALD M. HARVEY
INVENTOR.

BY William C. Oxton, III
Robert W. Hampton
ATTORNEYS

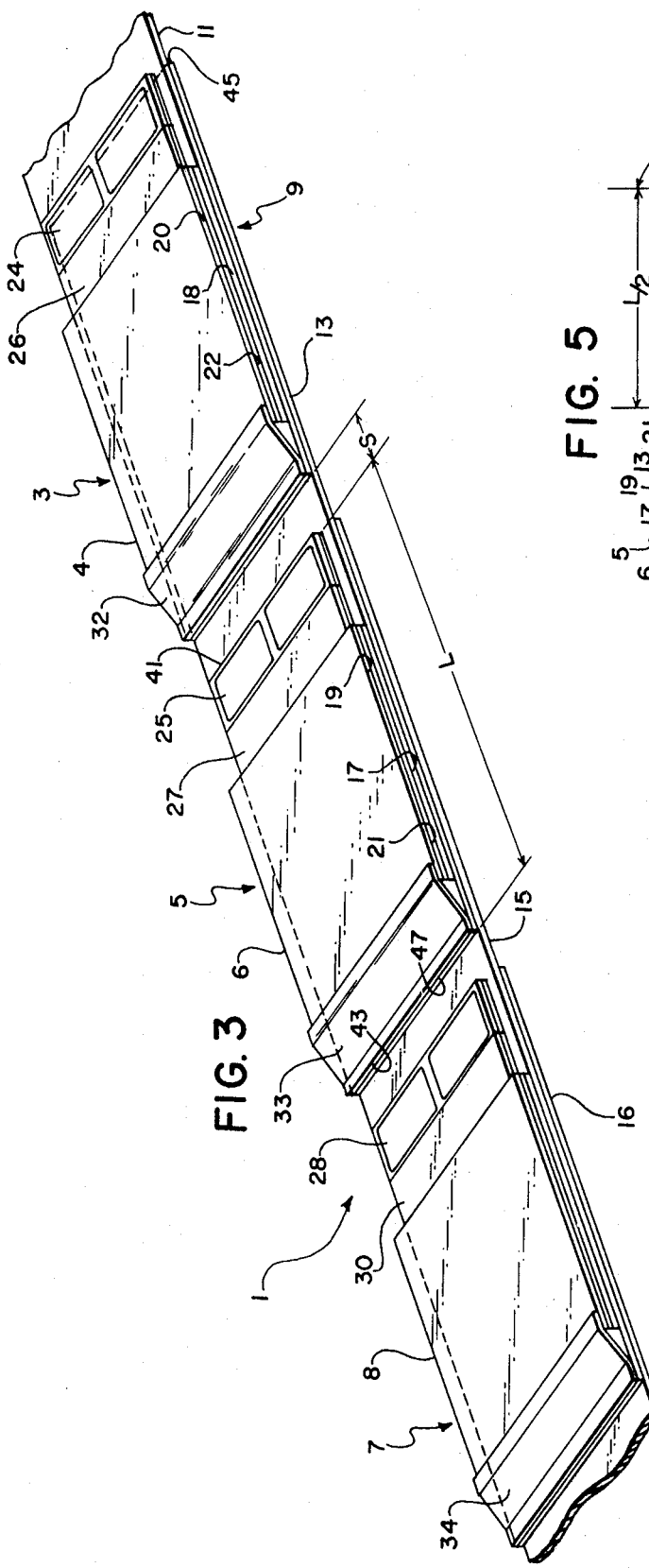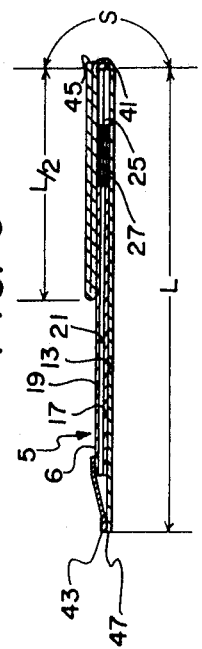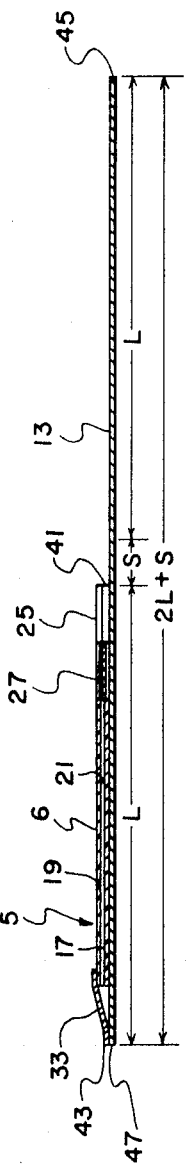

DONALD M. HARVEY
INVENTOR.

BY William C. Dixon, III
Robert W. Hampton

ATTORNEYS

DONALD M. HARVEY
INVENTOR.

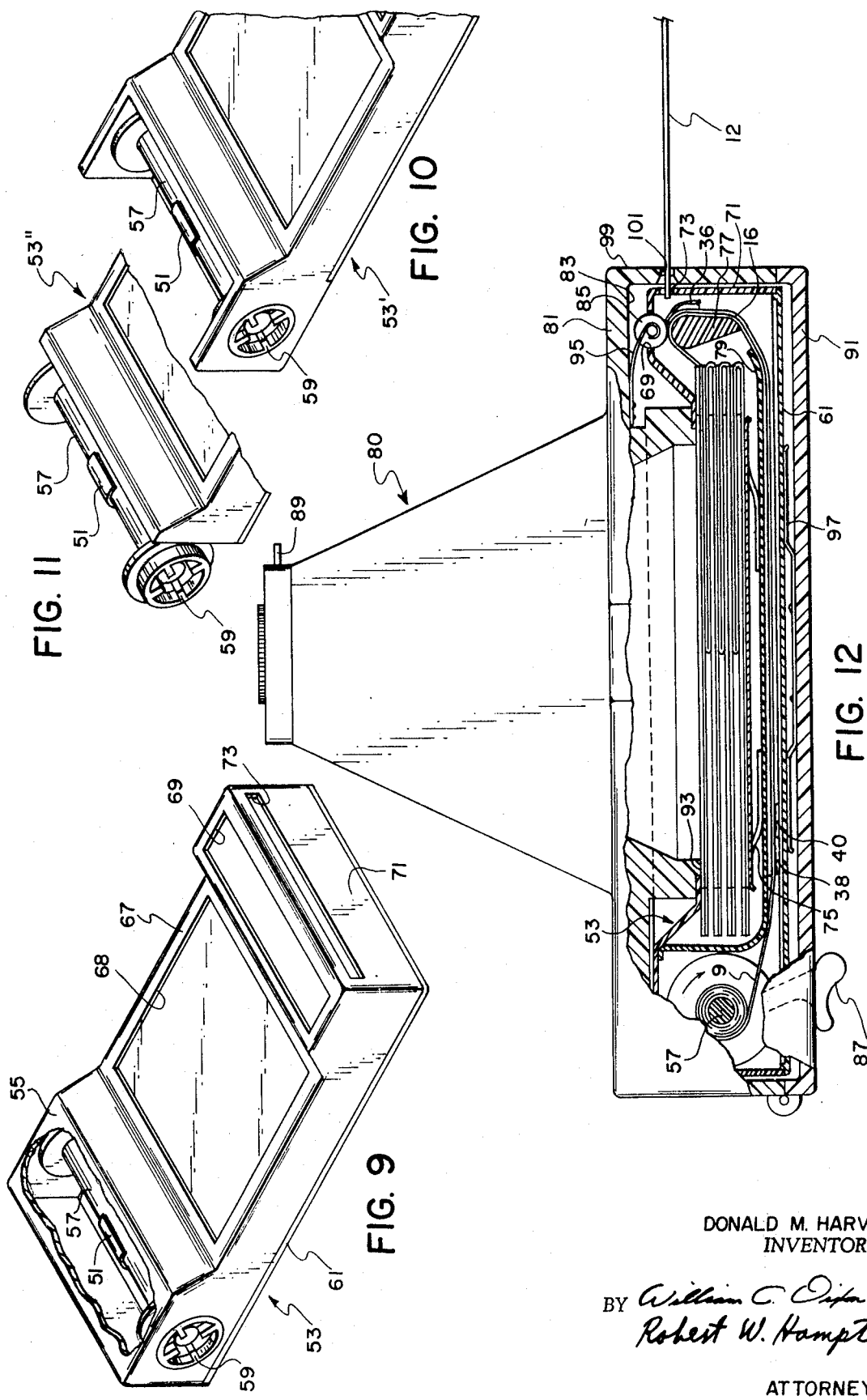

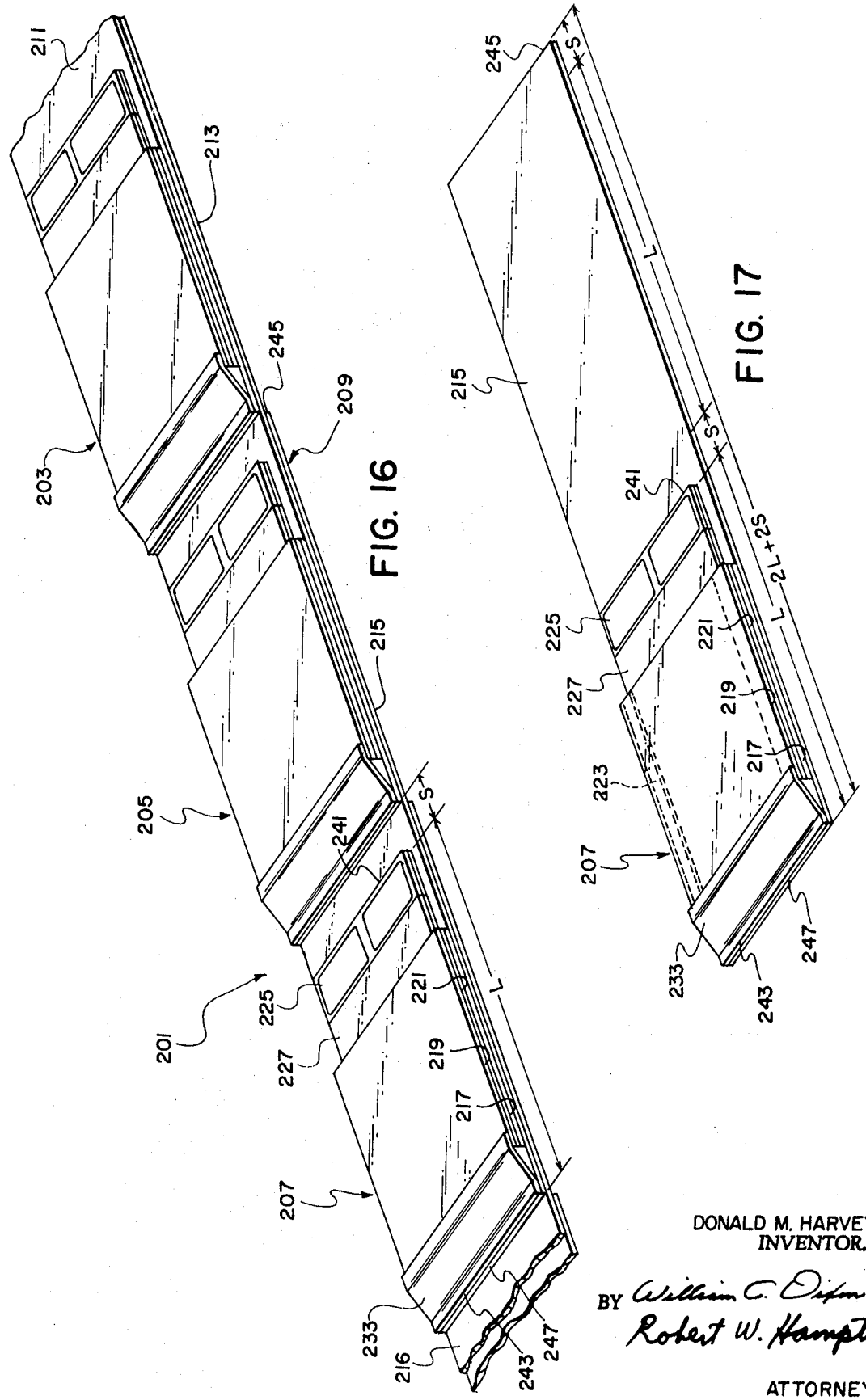

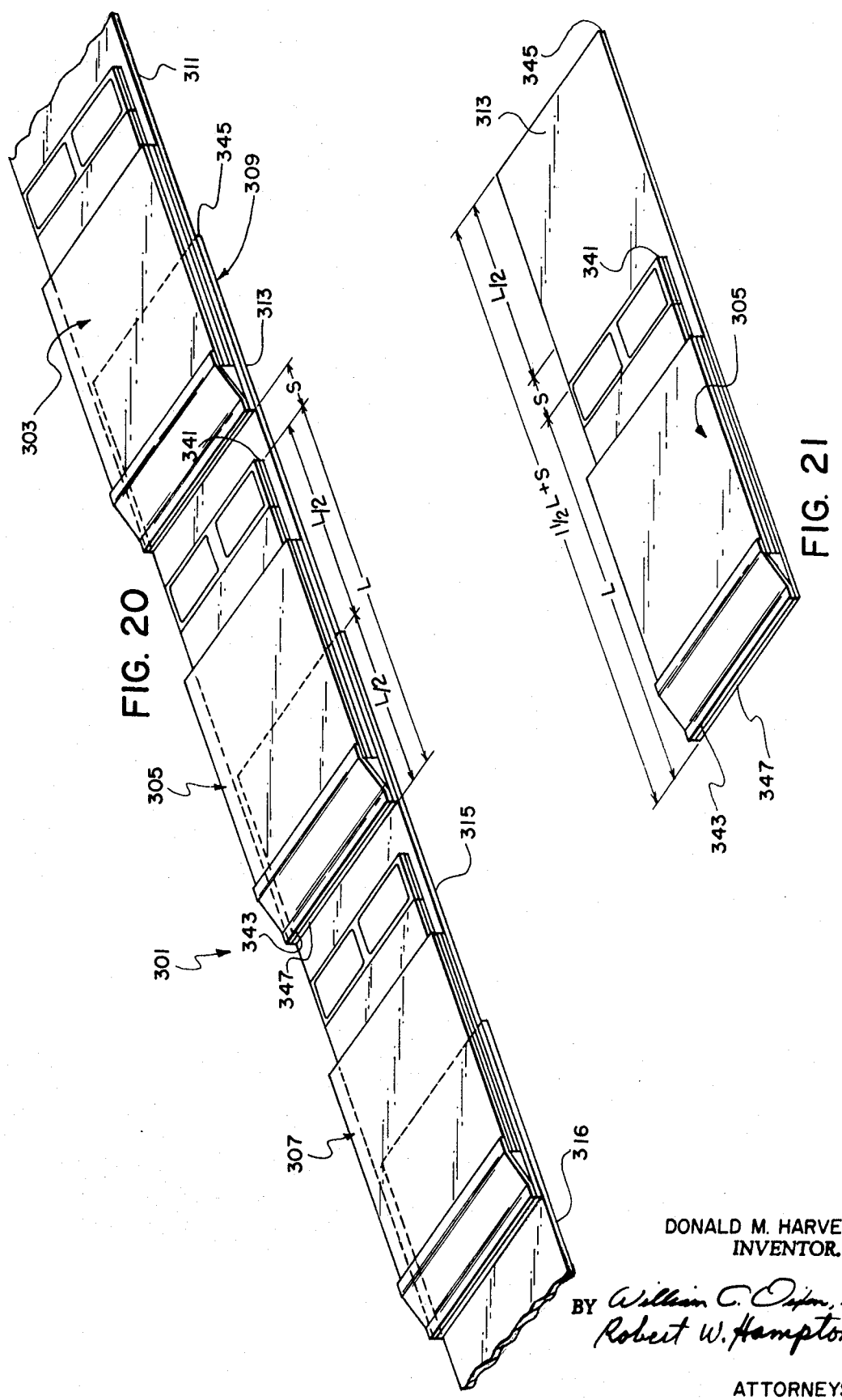

PATENTED JAN 25 1972 3,636,845

DONALD M. HARVEY
INVENTOR.

BY *William C. Dixon, II*
*Robert W. Hampton*

ATTORNEYS

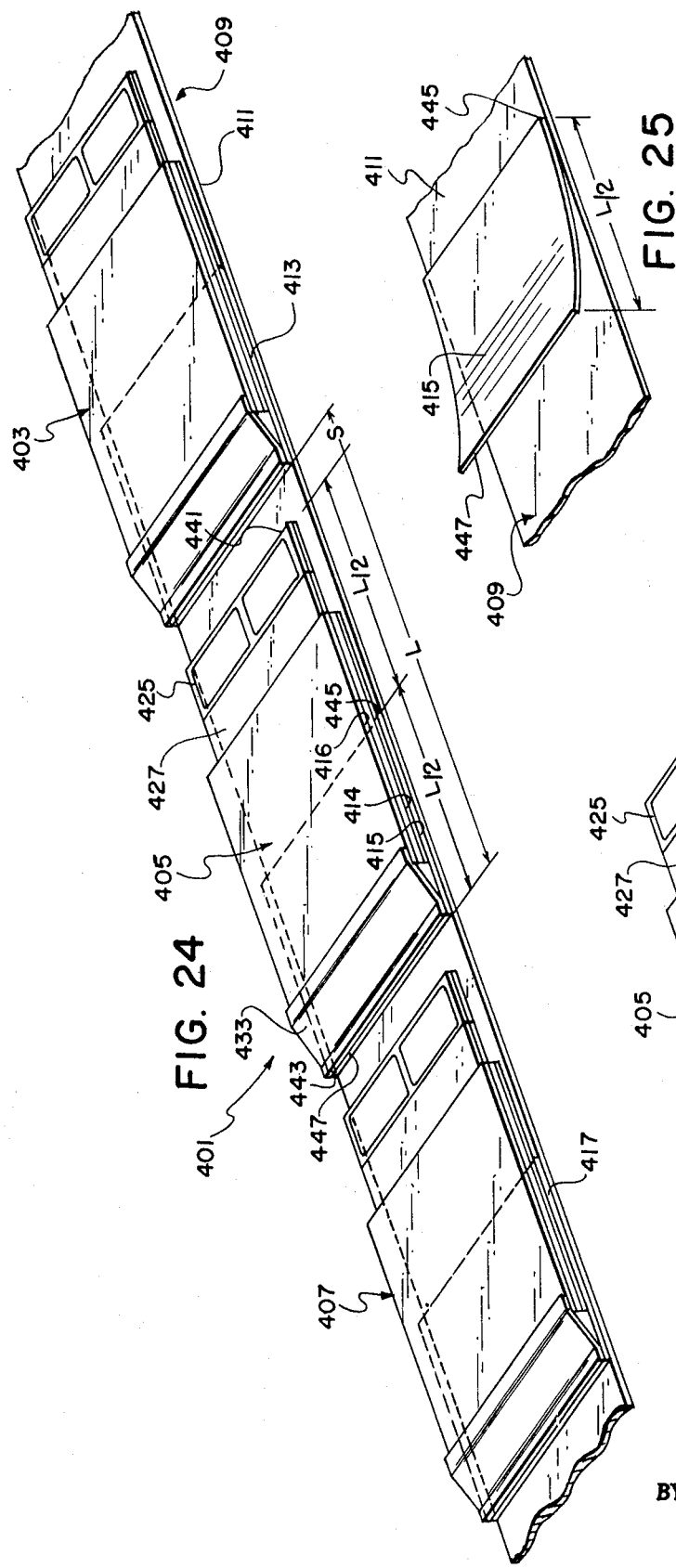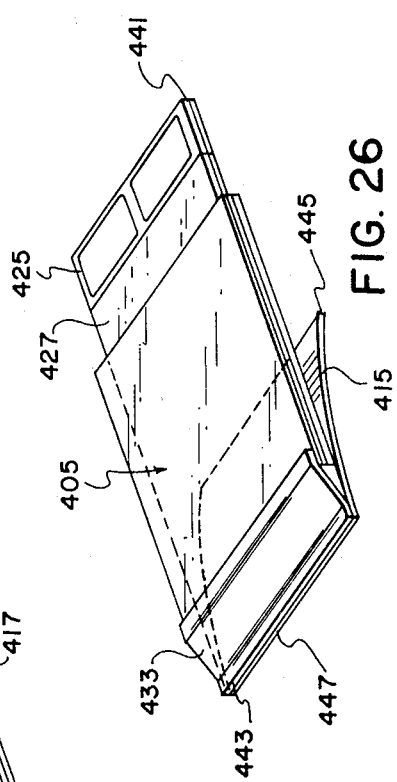

PHOTOGRAPHIC FILM UNIT ASSEMBLAGE

CROSS-REFERENCES TO RELATED APPLICATIONS

Reference is made to commonly assigned, copending U.S. Pat. application Ser. No. 033,677, entitled PHOTOGRAPHIC APPARATUS and filed May 1, 1970 in the name of Donald M. Harvey.

Reference is made to commonly assigned, copending U.S. Pat. Application Ser. No. 77,511, entitled PHOTOGRAHIC APPARATUS and filed on even date herewith in the name of Donald M. Harvey.

Reference is made to commonly assigned, copending U.S. Pat. application Ser. No. 77,473, entitled PHOTOGRAPHIC FILM-UNIT ASSEMBLAGE and filed on even date herewith in the name of Joseph D. Guite, Sr.

BACKGROUND OF THE INVENTION

1. FIELD OF THE INVENTION

This invention relates generally to photographic film units of the self-processing type, and particularly to improved assemblages of integral self-processing film units comprising a photosensitive element and a process sheet or second element permanently secured in overlying relationship to the photosensitive element.

2. Description of the Prior Art

It is well known in the photographic arts to provide film units with materials for processing the units immediately after their exposure. Generally such units include a photosensitive element, comprising a support having thereon at least one layer of photosensitive material, and a second element adapted to be registered over the photosensitive element for processing. A viscous processing composition is released from a rupturable pod at one end of the unit and is spread toward the other end by passing the unit between juxtaposed pressure-applying members that distribute the composition in a layer of predetermined thickness between the two elements. The distributed composition then permeates the layers of the unit to effect development of the photosensitive layer(s), and an imagewise distribution of dye or silver diffuses to or is formed on an image-receiving layer in either the photosensitive or second element to form the finished print.

In most presently commercial film units, generally referred to as being the "peel-apart" type, the photosensitive and second elements are separated during exposure, and thereafter are brought into superposition for processing. The image-receiving layer is in the second element, and that element is stripped from the rest of the unit after processing to provide a positive, right-reading print. Such units are disclosed, for example, in U.S. Pat. No. 3,080,805 and 3,511,659.

This invention is concerned with a more recently developed type of film unit, generally referred to as a "preregistered" or "integral" unit, in which a photosensitive element and a process sheet or second element are supplied as a permanently registered, integral pair. The elements of such a unit are superposed prior to exposure and remain superposed after processing. The process sheet or second element is transparent to permit exposure of the photosensitive material from the "top side" of the unit, and the image-receiving layer is located in either the process sheet or, preferably, the photosensitive element to provide a positive image that does not need to be stripped from the rest of the unit. Film units of the type having the image-receiving layer located in the process sheet are disclosed, for example, in French Pat. No. 2,006,255 and 2,006,256, granted to Polaroid Corporation and published Dec. 26, 1969. Film units of the type having the image-receiving layer located in the photosensitive element are disclosed, for example, in commonly assigned, copending U.S. Pat. application Ser. No. 027,990, entitled PHOTOGRAHPIC FILM UNIT FOR DIFFUSION TRANSFER PROCESSING, filed Apr. 13, 1970 in the name of H. E. Cole.

An assemblage of the latter type of film units and cooperating photographic apparatus are disclosed in commonly assigned, copending U.S. Pat. application Ser. No. 033,677, entitled PHOTOGRAPHIC APPARATUS and filed May 1, 1970 in the name of Donald M. Harvey. The assemblage there described comprises a plurality of film units whose permanently registered, integral pairs of elements are relatively stiff and are strippably attached to a relatively flexible web, by which the integral pairs of elements are transported within and out of a self-processing camera and from which the pairs of elements are separated by moving the web in a direction divergent from the direction of travel of the elements themselves. Pods of processing fluid and traps for receiving and retaining any excess fluid cooperate with the paired elements during processing but are securely adhered to and remain with the web upon stripping of the elements from the web. The web, pods, traps, and other processing waste material then are advanced into a storage device for later disposal, the cooperating apparatus including a combined cartridge and storage device so that the waste material need never be handled by the camera operator either upon inserting the cartridge into the camera or upon disposing of the cartridge after removal from the camera.

The assemblage there described poses the disadvantage of having the unit-transporting web at least twice as long as the collective length of the film units secured thereto, which results from the spacing of succeeding film units along the length of the web by a distance slightly exceeding the length of a single film unit. Such spacing of the film units, causing a pitch of approximately twice the film unit length, is a consequence of the manner in which the film units are interconnected by the web when they are stacked in superposed relationship for use in the cooperating apparatus, whereby the web extends from the trailing end of the top unit in the stack forwardly to the leading end of the next succeeding unit immediately beneath the top unit, and similarly between succeeding units on down the stack. Not only is one whole unit length of web material between succeeding film units costly and wasteful of web material but such length of web material also requires an excessive amount of web movement, and hence time, in order for the paired elements of the film units to be transported within and out of the camera. Moreover, the storage device in the cooperating apparatus, and hence the camera itself, needed to receive and store such length of web material after the paired elements have been transported out of the camera must be larger than would be necessary with a shorter web. To overcome the disadvantages encountered in that type of film unit assemblage, an improved assemblage, having a shorter length of unit-transporting web material between succeeding film units and yet capable of being arranged with the units stacked in superposed relationship while being operably interconnected by the web for ready use in the cooperating apparatus, is needed.

SUMMARY OF THE INVENTION

Accordingly, an object of the present invention is to provide an improved assemblage of integral self-processing film units that are interconnected by a unit-transporting web wherein the web material between succeeding film units is the a shorter length than has been found in assemblages known heretofore. Another object of the invention is to provide such an improved assemblage that is capable of being arranged with its film units stacked in superposed relationship while being operably interconnected by the unit-transporting web for ready use in cooperating photographic apparatus. A further object of the invention is to provide such an improved assemblage at a minimum cost of manufacture in order to provide the benefits obtainable from such an assemblage at a minimum cost to the ultimate user.

To meet these and other objects, the present invention provides an improved assemblage of integral self-processing film units that are interconnected by a unit-transporting web wherein the length of web material between succeeding film units is substantially less than the length of such material found in known assemblages. In the illustrated embodiments of the present invention, the length of web material between succeeding film units is approximately one-half the length of web material found between such units in prior assemblages. Such foreshortening of the interconnecting web material results not only in a considerable saving in the cost of such material but also in a reduction in the amount of web movement, and hence the time, required for the paired elements of the film units to be transported within and out of the cooperating apparatus. The shorter web of the present invention provides the further advantage of requiring less space in the storage device of the cooperating apparatus for receiving and storing the web after the paired elements have been separated therefrom, as will be seen in the description of the illustrated embodiments presented below. The film units in the assemblage of the present invention are so interconnected by the unit-transporting web that a very small length of web material is needed between succeeding film units, as contrasted with the unit length of web material needed in the known assemblages described above. As previously mentioned, in such known assemblages the top unit in a stack of the such units is connected by the web from the trailing end of the top unit to the leading end of the net succeeding unit immediately beneath the top unit. In the assemblage of the present invention, the top unit is connected by the interconnecting web from a point that is located along the length of the top unit forward of this trailing end, such as its midpoint or its leading end or even a point forward of its leading end, to the leading end of the next succeeding unit immediately below the top unit.

The invention, and its objects and advantages, will become more apparent in the detailed description of the illustrated embodiments presented below.

BRIEF DESCRIPTION OF THE DRAWINGS

In the detailed description of the illustrated embodiments of the invention presented below, reference is made to the accompanying drawings, in which:

FIG. 3 is a partial perspective view of the preferred embodiment of the assemblage of the present invention unfolded to show the relatively short length of web material between succeeding film units;

FIG. 4 is a sectional view of one of the film units in the assemblage of FIG. 3 attached to an interconnecting leader unfolded to show its overall length;

FIG. 5 is a sectional view of the film unit of FIG. 4 with its interconnecting leader folded as in a stack of such units;

FIG. 9 is a perspective view of the cooperating apparatus of FIG. 8 with a portion thereof broken away to show the enclosed web winding and storage device;

FIG. 10 is a partial perspective view of cooperating apparatus similar to the apparatus of FIG. 9 but modified so that the web winding and storage device is not enclosed by such apparatus;

FIG. 11 is a partial perspective view of cooperating apparatus similar of the apparatus of FIG. 10 but further modified so that the web winding and storage device is not supported by such apparatus;

FIG. 12 is a side elevational view, partially broken away for clarity of illustration, of a camera having therein the cooperating apparatus of FIG. 8;

FIG. 16 is a partial perspective view of the first alternative embodiment of the assemblage of the present invention unfolded to show the relatively short length of web material between succeeding film units;

FIG. 17 is a perspective view of one of the film units in the assemblage of FIG. 16 attached to an interconnecting leader unfolded to show its overall length;

FIG. 20 is a partial perspective view of the second alternative embodiment of the assemblage of the present invention unfolded to show the relatively short length of web material between succeeding film units;

FIG. 21 is a perspective view of one of the film units in the assemblage of FIG. 20 attached to an interconnecting leader unfolded to show its overall length;

FIG. 24 is a partial perspective view of the third alternative embodiment of the assemblage of the present invention unfolded to show the relatively short length of web material between succeeding film units;

FIG. 25 is a partial perspective view of the web in the assemblage of FIG. 24 showing one of the flap portions of the web attached to the main portion;

FIG. 26 is a perspective view of one of the film units in the assemblage of FIG. 24 attached to one of the flap portions of the web;

DESCRIPTION OF THE ILLUSTRATED EMBODIMENTS

Because certain aspects of photographic film assemblages and cooperating apparatus are well known, the following description is directed in particular to those elements forming, or cooperating directly with, the present invention, elements that are not specifically shown or described herein being understood to be selectable from those known in the art.

THE PRIOR ART

Figure 1:
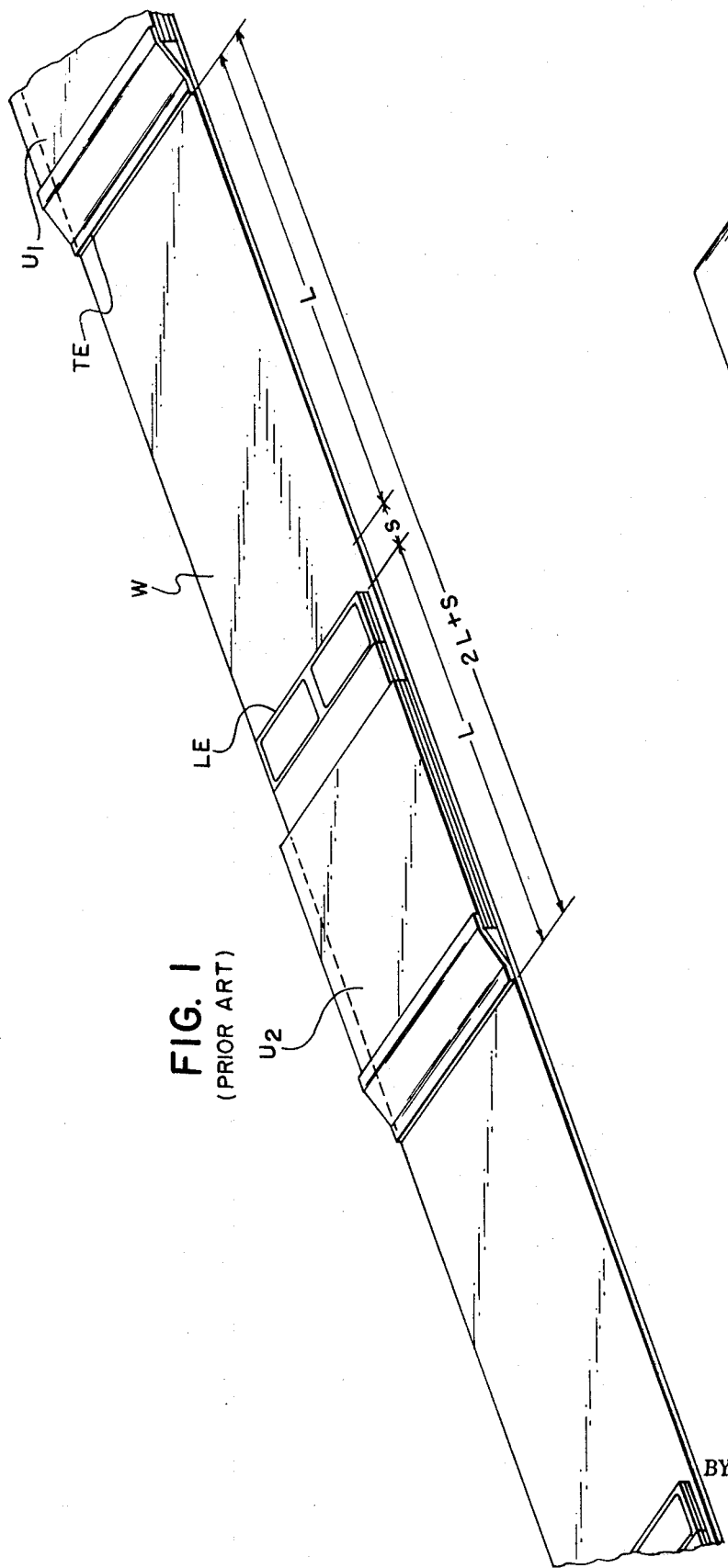
FIG. 1 is a partial perspective view of a prior art film assemblage unfolded to show the relatively long length of web material between succeeding film units.
Figure 2:
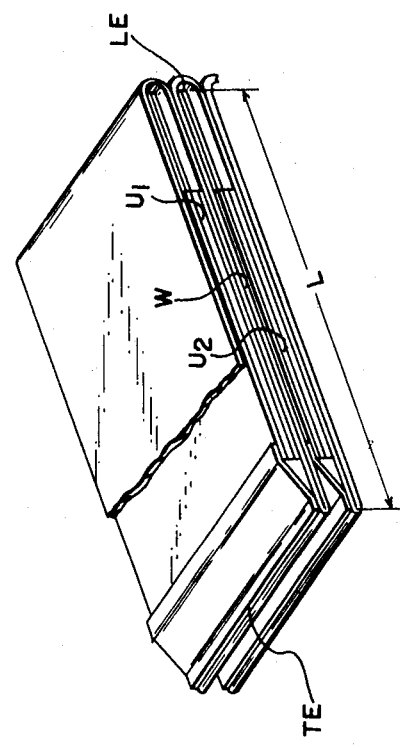
FIG. 2 is a partial perspective view of the prior art film assemblage of FIG. 1 folded so that the film units are stacked in superposed relationship.

FIG. 1 and 2 of the drawings illustrate a portion of an assemblage of film units of the type described in commonly assigned, copending U.S. Pat. application Ser. No. 033,677, entitled PHOTOGRAPHIC APPARATUS and filed May 1, 1970 in the name of Donald M. Harvey, the disclosure of which application is incorporated herein by reference. The self-processing film units of the assemblage are designated by the letters $U_1$, $U_2$, and the unit-transporting web to which the units are coupled is designated by the letter W. The length of each film unit is designated by the letter L, and the longitudinal space between succeeding units on the web is equal to he unit length L plus a relatively small amount designated by the letter S, the amount S being necessary to allow the web to be folded around the leading end of the unit as when a plurality of units are stacked in superposed relationship as shown in FIG. 2. Thus, as illustrated in FIG. 1, the pitch of the assemblage is equal to 2L+S, a condition necessitated by the manner in which succeeding units are interconnected by the web when such units are in stacked superposed relationship. As shown in FIG. 2, the upper unit $U_1$ is connected to the lower unit $U_2$ by the web W extending from the trailing end TE of upper unit $U_1$ forwardly to the leading end LE of lower unit $U_2$. Because of the aforementioned disadvantages of the unit length of web material between succeeding film units, an object of the present invention is to devise a way of shortening that length while still allowing the film assemblage to be arranged in a stack of superposed, interconnected units. That object is met by the present invention as manifested in the illustrated embodiments presented below.

THE PREFERRED EMBODIMENT

FIGS. 3–15 of the drawings illustrate the preferred embodiment of an assemblage according to the present invention and apparatus adapted for cooperation therewith. In FIG. 3 is shown part of a film assemblage 1 which comprises a plurality of self-processing film units 3, 5, 7 and a unit-transporting web 9 including a plurality of interconnected leaders 11, 13, 15, 16.

Film units 3, 5, 7 are of the type described in the aforementioned copending U.S. Pat. application Ser. No. 033,677. Film unit 5 and leader 13 are illustrated in FIGS. 4–7 as exemplary of other such units and leaders in the assemblage. Each unit includes a composite structure having a first layer of photosensitive material for establishing a developable latent image of a subject to which the photosensitive material is adapted to be exposed, a second layer of image-recording material, or mordent, for recording a visible image in response to development of the latent image, means for permanently maintaining the first and second layers in superposed relationship, and means for supplying to the layers a processing fluid adapted to effect development of the latent image and recording of the visible image. Preferably, both the first, or photosensitive, layer and the second, or image-recording, layer are supported in a single first sheet 17, a second sheet 19 being preregistered with first sheet 17 to control the spreading of the processing fluid over the two layers. First sheet 17 and second sheet 19 preferably remain registered as a unitized pair of sheets both before exposure and after processing, but the two sheets conceivably could be supplied in a separated relationship and then permanently registered after exposure. As shown more clearly in FIG. 7, the film unit further comprises a pair of parallel spacing members 21, 23 disposed along the longitudinal edges of, and between, sheets 17 and 19 to define a predetermined distance between sheets 17 and 19, at least during processing, and to confine the processing fluid to a layer of predetermined thickness between said edges.

With reference to film unit 5, illustrated in FIGS. 3–7, the supplying means of the unit includes a rupturable pod 25 containing the processing fluid and means and means for directing the fluid from the pod, when ruptured, between sheets 17 and 19 for distribution over the aforementioned first and second layers. Rupturable pod 25 is defined generally by one or more sheets of fluid-impervious material which are securely sealed around three edges to define a fluid container and which include a rupturable seal along the forth edge for discharging the fluid from the pod. The means for directing the fluid from the pod to the first and second layers comprises a funnel 27 made up of a pair of superposed, fluid-impervious sheets 29, 31 interposed between pod 25 and sheets 17, 19 in the manner shown in FIG. 7. It will be noted that pod 25 and funnel 27 are disposed at one end of sheets 17, 19. At the opposite end is a trap 33 for receiving and retaining any excess portion of processing fluid after the fluid has been distributed between sheets 17 and 19. Trap 33 comprises a skirt 35 that overlies sheet 19 and a pair of spacers 37, 39 that confine the excess processing solution between the ends of skirt 35. Pod 25 and trap 33 are securely adhered, or inseparably coupled, to leader 13, while the preregistered pair of sheets 17, 19 is strippably attached, or separably coupled, to leader 13 in a manner permitting separation of the pair of sheets from leader 13 by pulling leader 13 in a direction divergent from the direction of travel of the sheets. To make sheets 17, 19 readily separable from pod 25, funnel 27, and trap 33, the edges of sheets 29, 31 of funnel 27 are inserted between, but are not secured to, sheets 17 and 19. Similarly, skirt 35 of trap 33 overlies, but is not secured to sheet 19. Thus, as leader 13 is pulled away from sheets 17, 19, the funnel will simply slide out from between sheets 17 and 19, and skirt 35 will simply slide off sheet 19.

Figure 6:
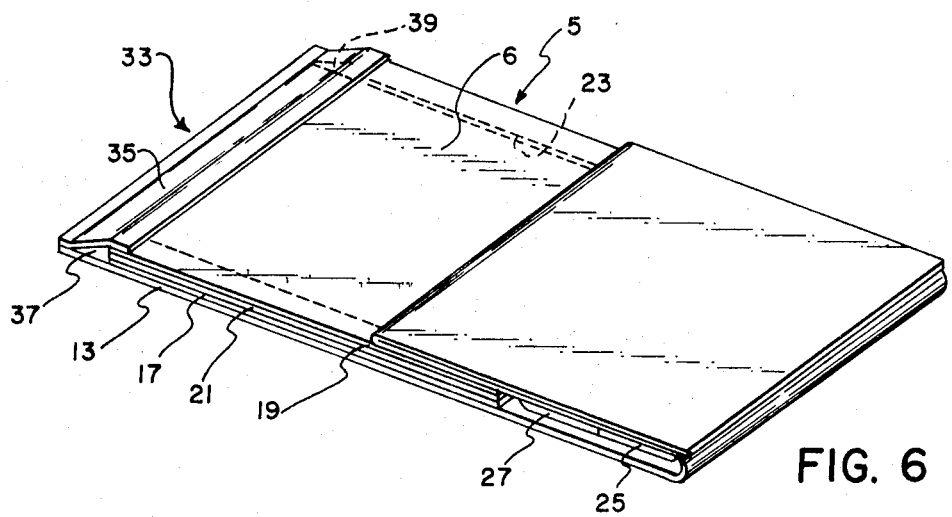
FIG. 6 is a perspective view of the film unit and folded leader of FIG. 5.
Figure 7:
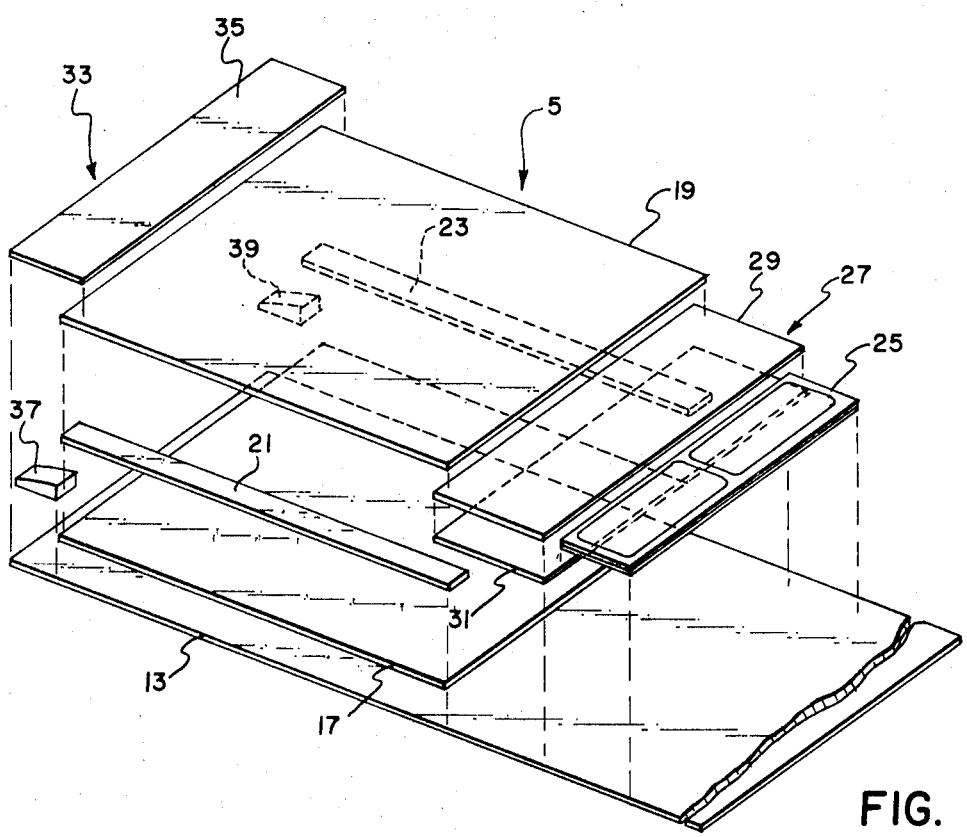
FIG. 7 is an exploded partial perspective view of the film unit and unfolded leader of FIG. 4.

Referring once again to FIG. 3, wherein is shown the preferred embodiment of an assemblage according to the present invention, it will be seen that leaders 11, 13, 15, 16 are interconnected in an overlapping or shingled relationship to form the unit-transporting web 9 to which film units 3, 5, 7 are attached in the manner described above. Taking film unit 5 as exemplary of film units in the assemblage, film unit 5 has a first or leading end 41 and a second or trailing end 43 defining the overall length L of the unit. Similarly, taking leader 13 as exemplary of all the leaders forming web 9, leader 13 has a first or leading end 45 and a second or trailing end 47 defining the overall length of the leader, which, as shown in FIG. 4, is equal to 2L+S. Thus, film unit 5 is disposed in superposed relationship to leader 13 so that second end 43 of film unit 5 coincides with second end 47 of leader 13 and the leading end of film unit 3 coincides with first end 45 of leader 13, thereby leaving the relatively small amount of space S between first end 41 of film unit 5 and the trailing end of film unit 3. Because sheets 17 and 19 of film unit 5 are permanently maintained in their preregistered, superposed relationship, only sheet 17 need be strippably attached to leader 13. Pod 25 of film unit 5 is securely attached to leader 13 at a first location on leader 13 between first end 45 and second end 47, which location is substantially coincident with the leading end of leader 15. First end 45 of leader 13 is securely attached, or inseparably coupled, to leader 11 at a second location along the length of leader 11 which is between the leading and trailing ends of leader 11 and which, as pointed out above, is substantially coincident with the leading end of film unit 3. In like manner, the leading end of leader 15 is securely attached, or inseparably coupled, to leader 13 at a location on leader 13 which is substantially coincident with first end 41 of film unit 5. Similarly, the leading end of leader 16 is connected to leader 15 at a location substantially coincident with the leading end of film unit 7. Thus, in manufacturing assemblage 1, the individual leaders can first be appropriately coupled to form web 9, and the film units can then be appropriately coupled to respective leaders along the web. Alternatively, each film unit and its leader can be appropriately coupled to form a subassembly such as illustrated in FIG. 4, and such subassemblies can then be assembled to form the entire assemblage. FIG. 4 illustrated a subassembly comprising film unit 5 and leader 13 unfolded to show the length relationship mentioned above. FIG. 5 illustrates the same subassembly with leader 13 folded over the leading half of film unit 5 as when assemblage 1 is arranged with its film units stacked in superposed relationship. FIG. 6 is a perspective view of the subassembly of FIG. 5.

Figure 8:
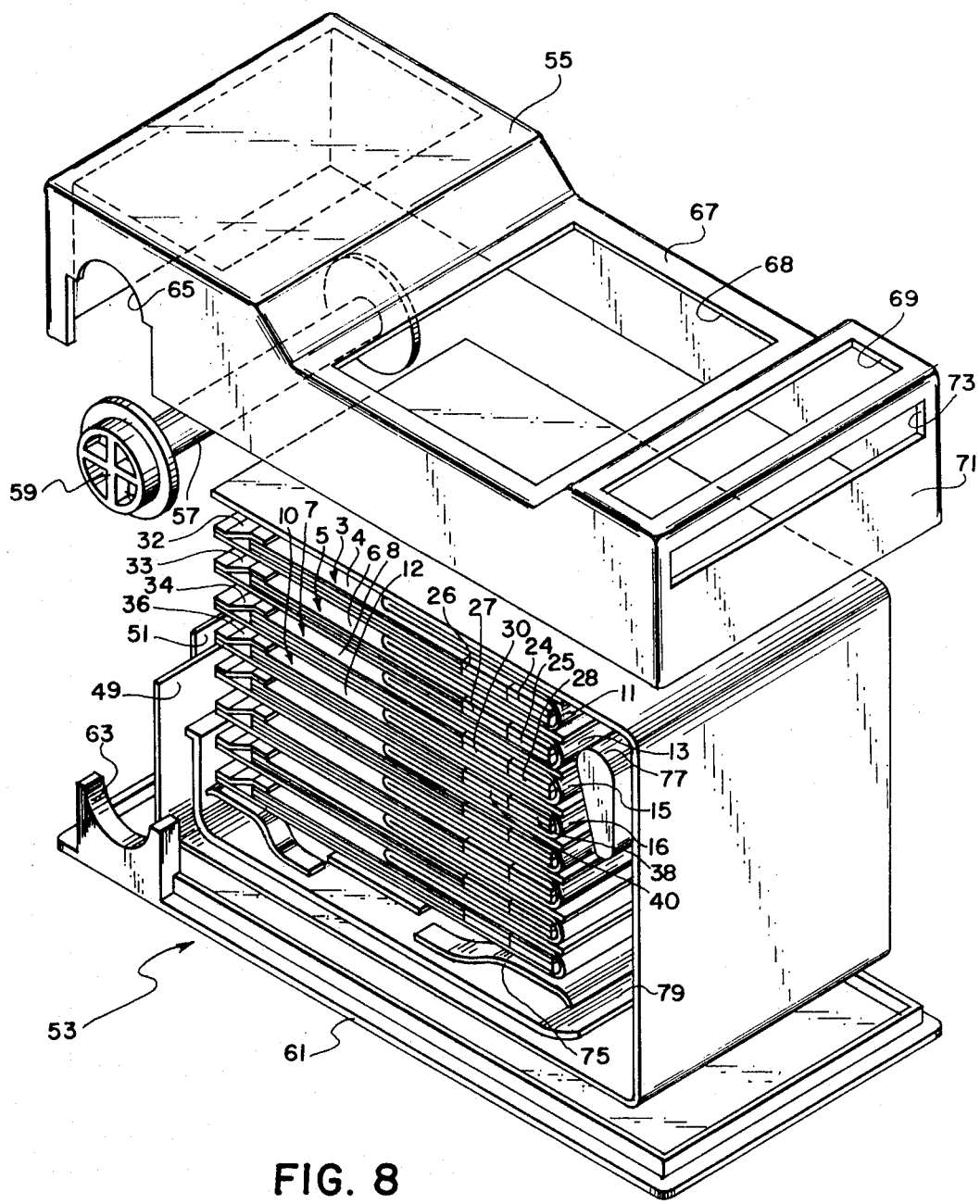
FIG. 8 is an exploded perspective view, exaggerated for clarity of illustration, of cooperating apparatus containing the assemblage of FIG. 3 with its film units stacked in superposed relationship.

While, for purposes of illustration, FIG. 3 shows only a three-unit portion of the preferred embodiment of an assemblage according to the present invention, the preferred embodiment in its entirety comprises a greater number of film units such as the eight units shown stacked in the cooperating apparatus of FIG. 8. Film units 3, 5, 7 of FIG. 3 are shown as the three uppermost units in the stack of units illustrated in FIG. 8. As may be seen in both FIGS. 5 and 8, when the units are stacked in superposed relationship, each leader is folded upwardly and around the leading end of this film unit and extends rearwardly toward and around the leading end of its film.

unit and extends rearwardly toward the trailing end of the unit to a point midway between the leading end and the trailing end of the unit, at which point the leader is then folded again and brought back upon itself toward the leading end of the unit so that the leading end of the leader ten coincides with the leading end of the unit. The leading end of the leader, it will be remembered, is securely attached to the leader preceding it at a point coinciding with the leading end of the film unit supported by the preceding leader. The forwardmost or leading portion 49 of film-transporting web 9 includes an adhesive element 51 for connecting web 9 to a storage device to be described more fully hereinafter in connection with the cooperating apparatus. Leading portion 49 is opaque to light actinic to the film units and extends across the uppermost film unit 3 to provide a dark cover for preventing premature exposure and for otherwise protecting the film units when contained in cooperating apparatus such as the cartridge 53 illustrated in FIG. 8. A trailing portion of web 9 also may be folded beneath the lowermost film unit in the stack to protect that unit against scratching or other damage by the cartridge itself or by some foreign material that accidentally might enter the cartridge.

The cartridge 53 includes a disposable housing 55 that defines a supply chamber or compartment adapted to receive an assemblage of stacked film units and a rectangular opening 68 through which the units can be exposed. Cartridge 53 supports a web transporting and storage device such as spool 57 having a clutch 59 adapted to cooperate with a camera winding mechanism to effect movement of the unit-transporting web and its attached film units within the cartridge. Supporting housing 55 is a bottom wall member 61 having a pair of semicircular bearing surfaces 63 (only one of which is visible in FIG. 8) for rotatably supporting spool 57 between surfaces 63 and a pair of complementing semicircular surfaces 65 (only one of which is visible in FIG. 8) in housing 55. In order to permit appropriate alignment between cartridge 53 and a camera receiving the cartridge, housing 55 includes an aligning and light-sealing surface 67 surrounding opening 68 and adapted to mate with a corresponding surface of the camera to locate properly the uppermost film unit 3 in a focal plane defied by the camera objective. Housing 55 is also provided with a rectangular opening 69 to receive a pressure-applying member of the camera in a manner to be described more fully hereinafter. Near opening 69 but in the end wall 71 of housing 55 is another rectangular opening 73, through which opening the preregistered first and second sheets of each film unit are adapted to be expelled from the cartridge. Bottom wall member 61 further supports a platen 75 adapted to urge resiliently each of the film units in the assemblage toward its uppermost position for proper alignment in the focal plane. Supported within cartridge 53 is a pressure-bearing and web-guiding member 77, the upper surface of which is disposed for alignment with the aforementioned pressure-applying member of the camera when the cartridge is received in the camera. It should be noted at this juncture that exit opening 73 and member 77 are both located in one end portion of cartridge 53, and that spool 57 is located in the opposite end portion of the cartridge. While FIG. 8 is an exploded view of cartridge 53 (exaggerated for clarity of illustration), FIG. 9 shows cartridge 53 as it appears fully assembled with a portion of the topmost wall of casing 55 broken away to better illustrate how spool 57 is supported and enclosed by the cartridge. FIG. 10 shows a cartridge similar to that shown in FIG. 9 but modified to the extent that spool 57 is not fully enclosed by the cartridge. FIG. 11 shows a cartridge similar to that illustrated in FIG. 10 but further modified in that spool 57 is neither enclosed nor supported by the cartridge, the spool being supported only by the leading end portion 49 of the unit-transporting web. In all three of the cartridges illustrated in FIGS. 9, 10 and 11, there is provided an interior wall member 79 adapted to defined a passageway between platen 75 and bottom wall member 61, through which passageway the unit-transporting web is movable from member 77 to spool 57, as will be explained more fully below.

A camera adapted to receive a cartridge of the type illustrated in FIGS. 8 and 9 is shown in FIG. 12. The camera, designated generally by the numeral 80, comprises a housing 81 defining a cartridge-receiving chamber 83 and supporting various camera components including a pressure-applying member 85, a web-advancing member 87, a shutter-operating member 89, and a closure or cover door 91. The cartridge 53 is inserted into camera 80 by opening cover door 91, placing the cartridge into receiving chamber 83, and then closing door 91, placing the cartridge into receiving chamber 83, and then closing door 91. This effects seating of cartridge 53 against a light seal 93 in the camera and positioning of pressure-applying member 85 partially into the cartridge through opening 69 in alignment with pressure-bearing and web-guiding member 77. Because pressure-applying member 85 is biased downwardly by its mounting spring 95, member 85 bears directly against the portion of the film assemblage that lies between members 77 and 85, as shown in FIG. 12. When cover door 91 is in its closed position, a spring member 97 thereon urges cartridge 53 forwardly into its operative position shown. In the right end wall 99 of housing 81 is an exit slot 101 in alignment with exit opening 73 of the cartridge, thereby providing a path of travel along which the preregistered first and second sheets of each film unit in the assemblage can pass out of the cartridge and camera. While the preregistered sheets of each film unit travel in a substantially straight line after passing between pressure members 77 and 85, the unit-transporting web is directed by member 77 downward, and thus away from that straight line, to effect separation of the web from the sheets. In FIG 12, the pairs of preregistered sheets 4, 6, 8 of film units 3, 5, 7, respectively, of assemblage 1 have already been expelled from the camera, and the pair of sheets 12 of film unit 10 is virtually expelled from the camera with its trailing end portion still in exit openings 73 and 101, leaving the last four film units of the assemblage in the cartridge. Unit-transporting web 9 is shown partially wound on spool 57, and trap 36 of film unit 10 is shown on web 9 to the right of pressure-applying member 85.

Figure 13:
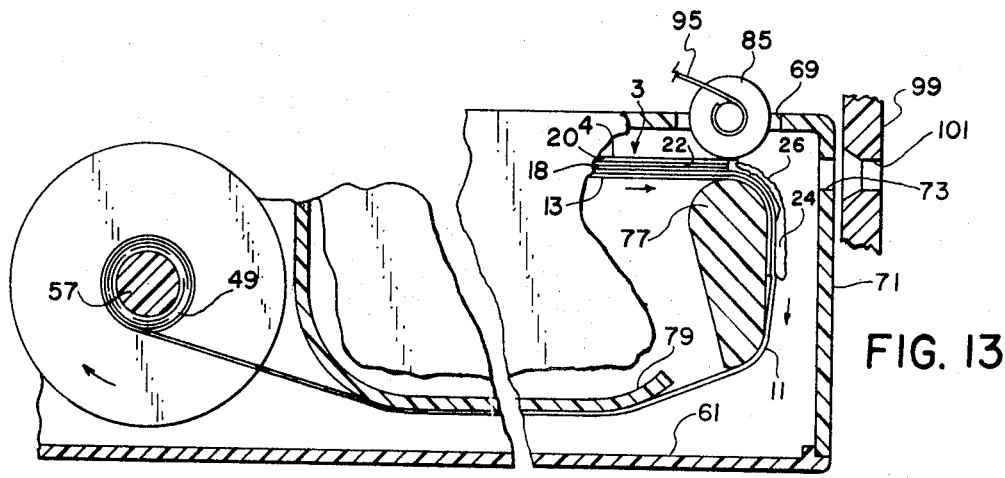
FIG. 13 is an enlarged sectional view of a portion of the camera of FIG. 12, showing the unit-transporting web and the pair of elements of one to the film units thereon as that pair of elements is about to be expelled from the camera.
Figure 14:
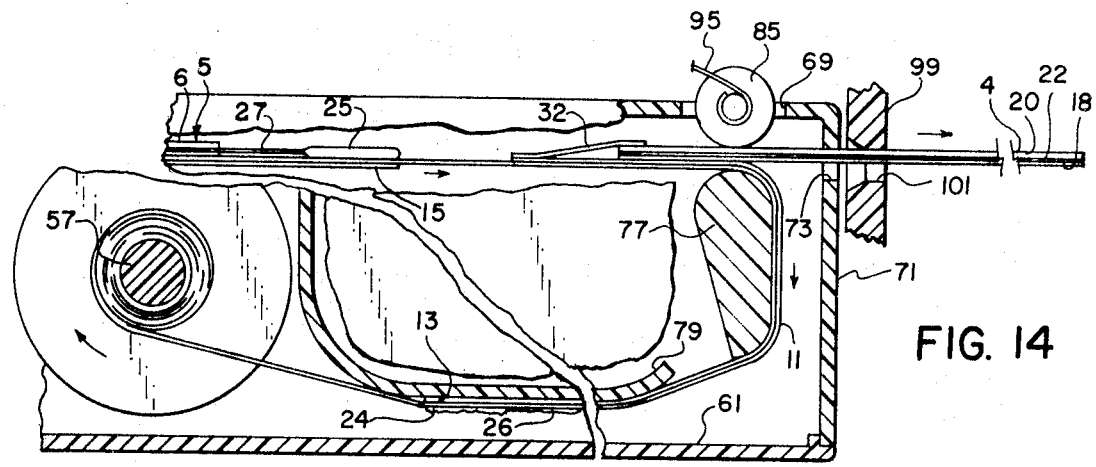
FIG. 14 is an enlarged sectional view similar to FIG. 13, showing the web and pair of elements as the pair of elements is being expelled from the camera.
Figure 15:
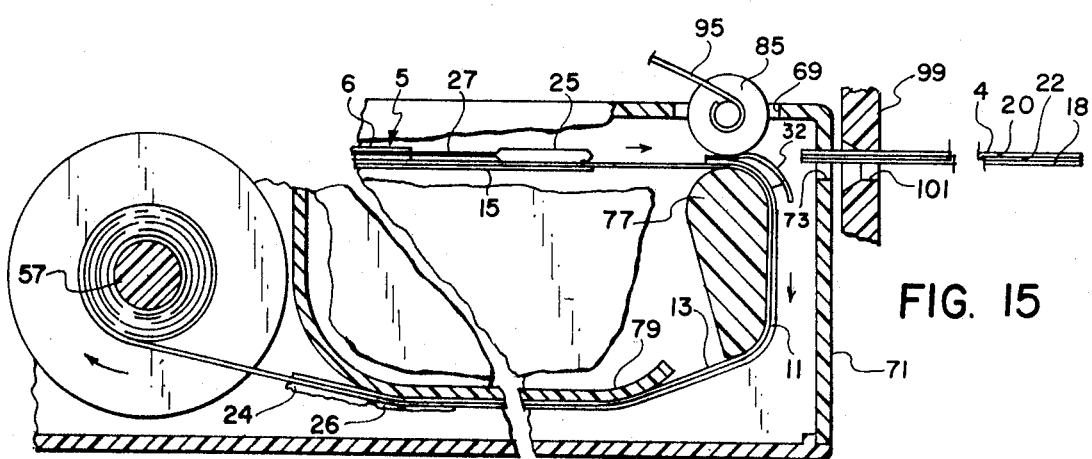
FIG. 15 is an enlarged sectional view similar to FIGS. 13 and 14 showing the web and pair of elements as the pair of elements has been virtually expelled from the camera.

Referring now to the operation of assemblage 1 in cartridge 53 in camera 80, FIGS. 13, 14, and 15 are enlarged partial sectional views of camera 80 having in its receiving chamber 83 the cartridge 53 containing film assemblage 1. In FIG. 13, leading portion 49 of web 9 is shown wrapped around spool 57, which has been rotated in response to the camera operator's manipulation of web-advancing member 87. This of course, would normally occur only after film unit 3 has been exposed in response to the operator's manipulation of shutter-operating member 89. In FIG. 13, web 9 has been wound on spool 57 just enough to pull film unit 3 into the bite of pressure members 77 and 85. Because the web is pulled downwardly around pressure-bearing and web-guiding member 77, leader 11 and the attached pod 24 and funnel 26 are directed along a path divergent from the path of travel of the preregistered pair of sheets 4, thereby effecting separation of the leader, pod, and funnel from the sheets. At this stage of the operation, pod 24 has been ruptured by its passage between pressure members 77 and 85 to initiate spreading of the processing fluid between preregistered sheets 18 and 20. FIG. 14 illustrates a stage of the operation reached after further winding of web 9 on the spool 57 in response to continued manipulation of member 87. At this stage, leader 11 is partially wound on spool 57 and has pulled almost all of film unit 3 through the bite of pressure members 77 and 85. Because the preregistered pair of sheets 4 is relatively stiff as compared with the relatively flexible web, the sheets follow the aforementioned substantially straight line path through exit openings 73 and 101, as shown. The continued divergence of movement of the sheets and the web thus causes their continued separation. FIG. 15 illustrates a still later stage of the operation reached when further winding of web 9 on spool 57 has caused the preregistered pair of sheets 4 to be virtually expelled from both the cartridge and the camera, leaving only the trailing end portion of the sheets in the exit openings and the trailing end portion of leader 11 and trap 32 between the pressure members. During passage of film unit 3 between the pressure members, the processing fluid supplied by pod 24 and funnel 26 is spread between sheets 18 and 20, any excess portion of the fluid being received and retained by trap 32. The preregistered pair of sheets 4 can now be exposed to ambient illumination and be handled by the camera operator, even though development of the latent image and recording of the visible image may not have been completed, because the opacifying agent in the processing fluid between sheets 18 and 20 protects the photosensitive layer in sheet 18 from exposure to such illumination add because the processing is self-timed to produce a right-reading positive print without further attention on the part of the operator.

As shown in FIGS. 14 and 15, film unit 5 follows closely behind film unit 3, the linear space between the two units having been reduced, by this invention, to the small amount S illustrated in FIGS. 3, 4, and 5. Because of such reduced spacing between succeeding film units, a lesser amount of web winding on spool 57 is needed in order to effect the necessary movement of the film units through the bite of pressure members 77 and 85, thereby reducing the time required for such movement, the diameter of web winding on the spool, the space needed in the cartridge for the winding, and hence the size of both the cartridge and the camera.

THE FIRST ALTERNATIVE EMBODIMENT

Figure 18:
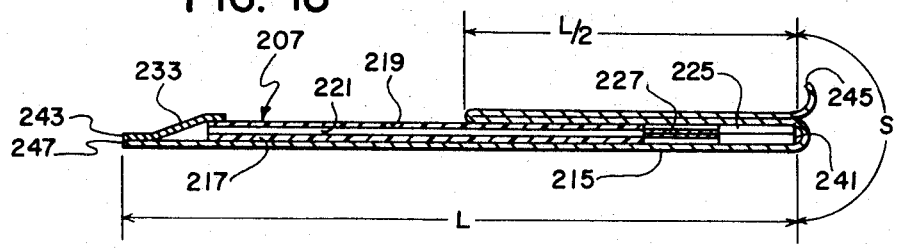
FIG. 18 is a sectional view of the film unit of FIG. 17 with its interconnecting leader folded as in a stack of such units.

FIGS. 16–19 of the drawings illustrate the first alternative embodiment of an assemblage according to the present invention. In FIG. 16 is shown part of a film assemblage 201 which comprises a plurality of self-processing film units 203, 205, 207 and a unit-transporting web 209 including a plurality of interconnected leaders 211, 213, 215, 216. Film units 203, 205, 207 are of the same type as those described above in regard to the preferred embodiment. Film unit 207 and leader 215 are illustrated in FIGS. 17 and 18 as exemplary of other such units and leaders in assemblage 201. Preferably, as in the preferred embodiment, both the photosensitive layer and the image-recording layer of film unit 207 are supported in a single first sheet 217, a second sheet 219 being preregistered with first sheet 217 to control the spreading of the processing fluid over the two layers. Also as in the preferred embodiment, and as shown in FIG. 17, film unit 207 further comprises a pair of parallel spacing members 221, 223 disposed along the longitudinal edges, spacing of, and between, sheets 217 and 219 to define a predetermined distance between sheets 217 and 219, at least during processing, and to confine the processing fluid to a layer of predetermined thickness between said edges.

With further reference to film unit 207, the supplying means of the unit includes a rupturable pod 225 containing the processing fluid and means for directing the fluid from the pod, when ruptured, between sheets 217 and 219 for distribution over the first and second layers. The means for directing the fluid from the pod to the first and second layers comprising a funnel 227 interposed between pod 225 and sheets 217, 219 in the manner shown. At the opposite end of sheets, 217, 219 is a trap 233 for receiving and retaining any excess portion of processing fluid after the fluid has been distributed between the two sheets. The construction and functions of pod 225, funnel 227, and trap 233 are the same as those described above in connection with the preferred embodiment. Also as described above, pod 225 and trap 233 are securely adhered, or inseparably coupled, to leader 215, while the preregistered pair of sheets 217, 219 is strippably attached, or separably coupled, to leader 215 in a manner permitting separation of the pair of sheets from leader 215 by pulling the leader in a direction divergent from the direction of travel of the sheets. Sheets 217, 219 are rendered readily separable from pod 225, funnel 227, and trap 233 by having the edges of funnel 227 inserted between, but not secured to, sheets 217 and 219, and by having the skirt of trap 233 simply overlying, but not secured to, sheet 219. Thus as leader 215 is pulled away from sheets 217, 219. Thus as leader 215 is pulled away from sheets 217, 219, the funnel simply slides out from between the two sheets, and the skirt of trap 233 simply slides off sheet 219.

As shown in FIG. 16, leaders 211, 213, 215, 216 are interconnected in an overlapping or shingled relationship to form the unit-transporting web 209 to which the film units are attached in the manner described above. Again taking film unit 207 as exemplary of the film units in assemblage 201, film unit 207 has a first or leading end 241 and a second or trailing end 243 defining the overall length L of the unit. Similarly taking leader 215 as exemplary of all the leaders forming web 209, leader 215 has a first or leading end 245 and a second or trailing end 247 defining the overall length of the leader, which as shown in FIG. 17, is equal to 2L+2S. Film unit 207 is disposed in such superposed relationship to leader 215 that second end 243 of film unit 207 coincides with second end 247 of leader 215, while leading end 241 of film unit 207 is spaced a distance of L+2S from leading end 245 of leader 215, thereby leaving the relatively small space S between film units 203 and 205 and between film units 205 and 207.

As in the preferred embodiment, because sheets 217, 219 of film unit 207 are permanently maintained in their preregistered, superposed relationship, only sheet 217 need be strippably attached to leader 215. Pod 225 of film unit 207 is securely attached, or inseparably coupled, to leader 215 at a first location between first end 245 and second end 247 of leader 215 which is substantially coincident with leading end 241 of film unit 207. First end 245 of leader 215 is securely attached, or inseparably coupled, to leader 213 at a second location between the leading and trailing ends of leader 213 which, as pointed out above, is substantially coincident with the trailing end of film unit 203. In like manner, the leading end of leader 216 is securely attached, or inseparably coupled, to leader 215 at a location on leader 215 which is substantially coincident with the trailing end of film unit 205.

As in the preferred embodiment, in manufacturing assemblage 201 the individual leaders can first be appropriately coupled to form web 209, and the film units can then be appropriately coupled to their respective leaders along the web. Alternatively, each film unit and its leader can be appropriately coupled to form a subassembly such as that illustrated in FIG. 17, and such subassemblies can then be assembled to form the entire assemblage. Although each leader in this embodiment is longer than its counterpart in the preferred embodiment by the amount S, and therefore uses slightly more web material, this embodiment does offer an advantage over the preferred embodiment in that succeeding leaders in this embodiment are attached to each other at a point that is spaced from the nearest film unit pod. This could prove advantageous during manufacture of the assemblage, particularly in the alternative method mentioned above.

FIG. 17 illustrates a subassembly comprising film unit 207 and leader 215 unfolded to show the length relationship mentioned above. FIG. 18 illustrates the same subassembly with leader 215 folded over the leading half of film unit 207, as when assemblage 201 is arranged with its film units stacked in superposed relationship.

Figure 19:
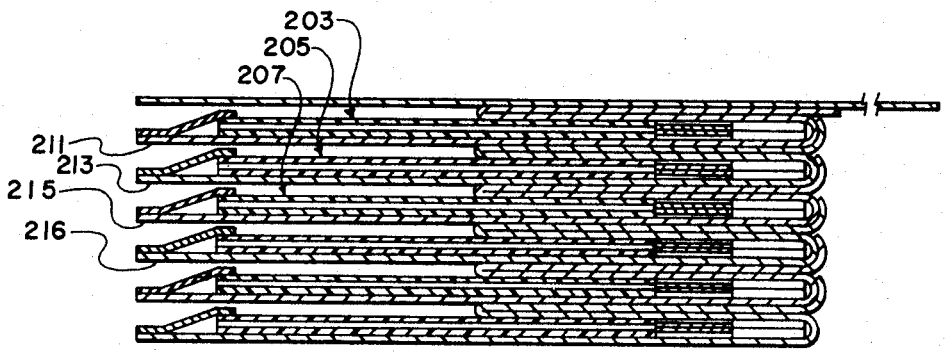
FIG. 19 is a sectional view of the assemblage of FIG. 16 with its film units stacked in superposed relationship.

While, for purposes of illustration, FIG. 16 shows only a three-unit portion of the first alternative embodiment of an assemblage according to the present invention, this embodiment in this entirety comprises a greater number of film units such as the six units shown stacked in superposed relationship in FIG. 19. In FIG. 19, film units 203, 205, 207 are shown as the three uppermost units in the stack. When the units are so stacked, each leader is folded upwardly and around the leading end of this film unit and extends rearwardly to a point midway between the leading and trailing ends of the unit, at which point the leader is folded again and brought back upon itself toward the leading end of the unit, so that the leading end of the leader can then be folded around the leading end of the preceding unit immediately above.

Although now shown, the forwardmost or leading portion of unit-transporting web 209 includes an adhesive element, similar to element 51 of the preferred embodiment, for connecting the web to a storage device in cooperating apparatus such as that described in connection with the preferred embodiment. Similarly, the leading portion of the web is opaque to light actinic to the film units and extends across the uppermost film unit 203 to provide a dark cover for preventing premature exposure and for otherwise protecting the film units when contained in the cooperating apparatus. The operation of assemblage 201 in cooperating apparatus such as the cartridge and camera structures illustrated in FIGS. 8–15 is identical to that already described with reference to the referred embodiment, and need not be discussed further in connection with this embodiment.

THE SECOND ALTERNATIVE EMBODIMENT

Figure 22:
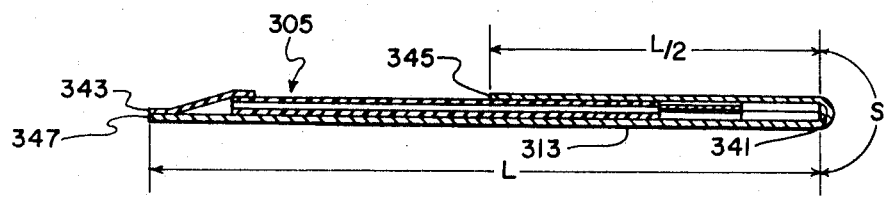
FIG. 22 is a sectional view of the film unit of FIG. 21 with its interconnecting leader folded as in a stack of such units.

FIGS. 20–23 of the drawings illustrate the second alternative embodiment of an assemblage according to the present invention. In FIG. 20 is shown in part of a film assemblage 301 which comprises a plurality of self-processing film units 303, 305, 307 and a unit-transporting web 309 including a plurality of interconnected leaders 311, 313, 315, 316. Film units 303, 305, 307 are identical to those described and referred to above in regard to the preferred and first alternative embodiments, and need not be discussed further in connection with this embodiment. Film unit 305 and leader 313 are illustrated in FIGS. 21 and 22 as exemplary of other such units and leaders in assemblage 301. As in the above-described embodiments, the pod and trap of film unit 305 are securely adhered, or inseparably coupled, to leader 313, while the pair of preregistered sheets of film unit 305 is strippably attached, or separably coupled, to leader 313 in a manner permitting separation of the pair of sheets from leader 313 by pulling the leader in a direction divergent from the direction of travel of the sheets. The preregistered sheets are rendered readily separable from the pod, funnel, and trap of film unit 305 by having the edges of the funnel inserted between, but not secured to, the preregistered sheets, and by having the skirt of the trap simply overlying, but not secured to, the uppermost one of the preregistered sheets.

As shown in FIG. 20, leaders 311, 313, 315, 316 are interconnected in an overlapping or shingled relationship to form the unit-transporting web 309 to which the film units are attached in the manner described above. Again taking film unit 305 as exemplary of the film units in assemblage 301, film unit 305 has a first or leading end 341 and a second or trailing end 343 defining the overall length L of the unit. Similarly taking leader 313 as exemplary of all the leaders forming web 309, leader 313 has a first or leading end 345 and a second or trailing end 347 defining the overall length of the leader, which, as shown in FIG. 21, is equal to 1½L+S. Film unit 305 is disposed in such superposed relationship to leader 313 that second end 343 of film unit 305 coincides with second end 347 of leader 313, while leading end 341 of film unit 305 is spaced a distance of ½L+S from leading end 345 of leader 313, thereby leaving the relatively small space S between film units 303 and 305.

The pod of film unit 305 is securely attached, or inseparably coupled, to leader 313 at a first location between first end 345 and second end 347 of leader 313 which is substantially coincident with leading end 341 of film unit 305. First end 345 of leader 313 is securely attached, or inseparably coupled, to leader 311 at a second location on leader 311 which is substantially midway between the leading and trailing ends of film unit 303. In like manner, the leading end of leader 315 is securely attached, or inseparably coupled, to leader 313 at a location on leader 313 which is substantially midway between the leading and trailing ends of film unit 305.

As mentioned in connection with the above-described embodiments, in manufacturing assemblage 301 the individual leaders can first be appropriately coupled to form web 309, and the film units can be then be appropriately coupled to their respective leaders to complete the assemblage. Alternatively, each film unit and this leader can be appropriately coupled to form a subassembly such as that illustrated in FIG. 21, and such subassemblies can then be assembled to complete and assemblage. It will be noted that each leader in this embodiment is shorter than its counterparts in the preferred and first alternative embodiments, and therefore uses less web material.

FIG. 21 illustrates a subassembly comprising film unit 305 and leader 313 unfolded to show the length relationship mentioned above. FIG. 22 illustrates the same subassembly with leader 313 folded over the leading half of film unit 305 as when assemblage 301 is arranged with this film units stacked in superposed relationship.

Figure 23:
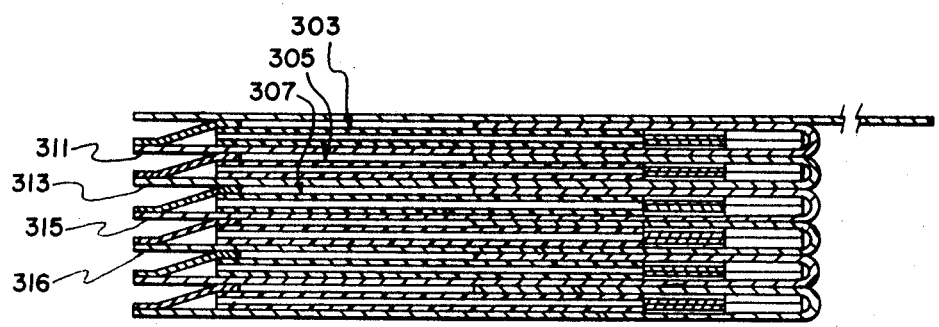
FIG. 23 is a sectional view of the assemblage of FIG. 20 with its film units stacked in superposed relationship.

While, for purposes of illustration, FIG. 20 shows only a three-unit portion of the second alternative embodiment of an assemblage according to the present invention, this embodiment in its entirety comprises a greater number of film units such as the six units shown stacked in superposed relationship in FIG. 23. In FIG. 23, film units 303, 305, 307 are shown as the three uppermost units in the stack. When the units are so stacked, each leader is folded upwardly around the leading end of its film unit and extends rearwardly to a point midway between the leading and trailing ends of the unit, at which point the leading end of the leader is securely attached to the preceding leader immediately above.

Although not shown, the forwardmost or leading portion of unit-transporting web 309 includes an adhesive element, similar to element 51 of the preferred embodiment for connecting the web to a storage device in cooperating apparatus such as that described in regard to the preferred embodiment Also, the leading portion of the web is opaque to light actinic to the film units and extends across the uppermost film unit 303 to provide a dark cover for preventing premature exposure and for otherwise protecting the film units when contained in the cooperating apparatus. The operation of assemblage 301 in cooperating apparatus such as the cartridge and camera structures illustrated in FIGS. 8–15 is identical to that already described with reference to the preferred embodiment, and need not be discussed further in connection with this embodiment.

THE THIRD ALTERNATIVE EMBODIMENT

FIGS. 24–28 of the drawings illustrated the third alternative embodiment of an assemblage according to the present invention. In FIG. 24 is shown part of a film assemblage 401 which comprises a plurality of self-processing film units 403, 405, 407 and a unit-transporting web 409 including a main portion 411 and a plurality of flap portions 413, 415, 417 hingedly coupled to the main portion. Film units 403, 405, 407 are identical to those already described and referred to in connection with the other embodiments. Taking film unit 405 as exemplary of all film units in assemblage 401, film unit 405 includes a pod 425 and a funnel 427 for supplying a processing fluid to and between a pair of preregistered, superposed sheets 414, 416, and a trap 433 for receiving an retaining any excess portion of the fluid. Film unit 405 has a first or leading end 441 and a second or trailing end 443 defining the overall length L of the unit. Main portion 411 of web 409 comprises a relatively long strip of web material, to which are securely attached, or inseparably coupled, the plurality of flap portions 413, 415, 417. The flap portions are uniformly spaced along the length of the main portion so that the film units can be mounted thereon with only the small space S remaining between succeeding units. In FIG. 25 is shown the part of main portion 411 having flap portion 415 attached to it. Taking flap portion 415 as exemplary of all the flap portions of web 409, flap portion 415 has a first or leading end 445 and a second or trailing end 447 defining the length of the flap portion, which, as shown in FIGS. 24 and 25, is equal to ½L. Film unit 405 is disposed in such superposed relationship to flap portion 415 that trailing end 443 of film unit 405 is substantially coincident with trailing end 447 of flap portion 415, while leading end 441 of film unit 405 is spaced a distance of substantially ½L from leading end 445 of flap portion 415. Pod 425 of film unit 405 is securely adhered, or inseparably coupled, to funnel 427 and to main portion 411, while trap 433 of film unit 405 is securely adhered, or inseparably coupled, to flap portion 415, the pair of sheets 414, 416 of film unit 405 being strippably attached, or separably coupled, to either main portion 411 or flap portion 415, or to both, in a manner permitting separation of the sheets from the web by pulling the web in a direction divergent from the direction of travel of the sheets. As explained in connection with the other embodiments, the pair of sheets 414, 416 is rendered readily separable from pod 425, funnel 427, and trap 433 by having the edges of funnel 427 inserted between, but not secured to the pair of sheets, and by having the skirt of trap 433 overlying, but not secured to, the uppermost one of the two sheets. Thus, as the web is pulled away from the pair of sheets, the funnel simply slides out from between the two sheets, and the skirt of the trap simply slides off the uppermost sheet.

Pod 425 of film unit 405 is securely attached, or inseparably coupled, to main portion 411 at a first location between the leading and trailing ends of the main portion that is substantially coincident with leading end 441 of film unit 405 and spaced a distance of substantially ½L from leading end 445 of flap portion 415. Leading end 445 of flap portion 415 is securely attached, or inseparably coupled, to main portion 411 at a second location between the leading and trailing ends of the main portion that is spaced substantially midway between leading end 441 and trailing end 443 of film unit 405. Thus, film units 403, 405, 407 are disposed in such superposed relationship to their respective flap portions 413, 415, 417 that substantially half of each film unit overlies the flap portion to which it is attached while the other half of that film unit overlies an adjacent area of the main portion.

In manufacturing assemblage 401, the flap portions can first be appropriately coupled to the main portion to form web 409, and the film units can then be appropriately coupled to their respective flap portions and adjacent areas of the main portion to complete the assemblage. Alternatively, each film unit and its flap portion can be appropriately coupled to form a subassembly such as that illustrated in FIG. 26, and such subassemblies can then be appropriately coupled to the main portion of the web to complete the assemblage. FIG. 26 illustrates a subassembly comprising film unit 405 and flap portion 415, wherein the flap portion is securely attached, or inseparably coupled, to trap 433 and may be strippably attached or separably coupled, to the pair of preregistered sheets 414, 416. As mentioned above, the pair of preregistered sheets can be strippably attached to either the flap portion or the adjacent area of the main portion or the both.

Figure 27:
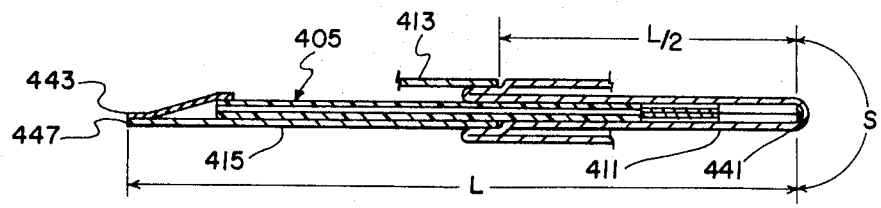
FIG. 27 is a sectional view of a portion of the assemblage of FIG. 24, showing one of the film units therein with a portion of the web attached to and folded around the units as in a stack of such units.
Figure 28:
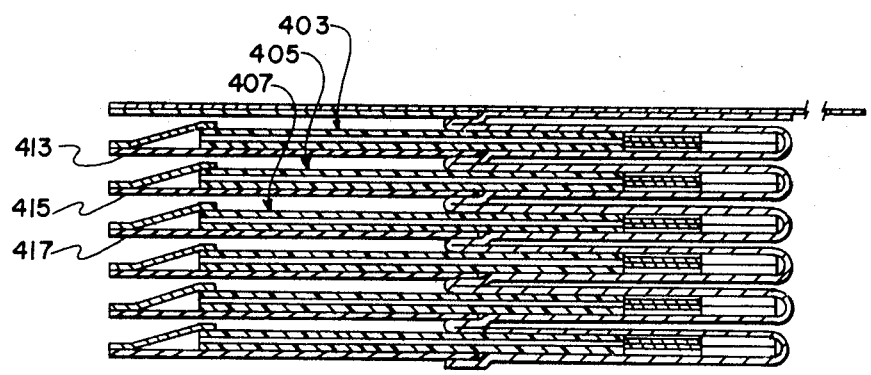
FIG. 28 is a sectional view of the assemblage of FIG. 24 with its film units stacked in superposed relationship.

While, for purposes of illustration, FIG. 24 shows only a three-unit portion of the third alternative embodiment of an assemblage according to the present invention, this embodiment in its entirety comprises a greater number of film units such as the six units shown stacked in superposed relationship in FIG. 28. In FIG. 28, film units 403, 405, 407 are shown as the uppermost units in the stack. When the units are so stacked, as shown in FIGS. 27 and 28, the main portion of the web is folded upwardly around the leading end of each film unit and extends rearwardly over that unit to a point midway between the leading and trailing ends of that unit, at which point one of the flap portions projects rearwardly from the main portion to the trailing end of preceding film unit immediately above, while the main portion is folded again and brought back upon itself to be folded upwardly around the leading end of the preceding unit immediately above, and so on up the stack.

In this embodiment as in the others, although not shown, the forwardmost or leading portion of unit-transporting web 409 includes an adhesive element, similar to element 51 of the preferred embodiment, for connecting the web to a storage device in cooperating apparatus such as that described in connection with the preferred embodiment. Also, the leading portion of the web is opaque to light actinic to the film units and extends across the uppermost film unit 403 to provide a dark cover for preventing premature exposure and for otherwise protecting the film units when contained in the cooperating apparatus. The operation of assemblage 401 in cooperating apparatus such as the cartridge and camera structures illustrated in FIGS. 8–15 is identical to that already described with reference to the preferred embodiment, and need not be described further in connection with this embodiment.

It will be seen, with reference to all the embodiments described herein, that the aforementioned objects of the present invention are thus achieved in the provision of an improved assemblage of integral self-processing film units interconnected by a unit-transporting web wherein the web material between succeeding film units is of a substantially shorter length than that found in assemblages of such units known heretofore. The assemblage of the present invention is capable of being arranged with its film units stacked in superposed relationship while being operably interconnected by the unit-transporting web for ready use in cooperating photographic apparatus, and is relatively simple and inexpensive to manufacture so as to provide the benefits obtainable from such an assemblage at a minimum cost to the ultimate user.

The invention has been described in detail with particular reference to the illustrated preferred and alternative embodiments thereof, but it will be understood that variations and modifications can be effected within the spirit and scope of the invention.

I claim:

1. A film unit assemblage for use in a cooperating photographic apparatus, said assemblage comprising:
    a. a plurality of film units, each unit having first and second ends defining a first overall length, each unit including a layer of photosensitive material for establishing a developable latent image of a subject to which said photosensitive material is adapted to be exposed, a layer of image-recording material for recording a visible image in response to development of the latent image, means for permanently maintaining said layers in superposed relationship, and means for supplying to said layers a processing fluid adapted to effect development of the latent image and recording of the visible image, said supplying means being separably coupled to said layers, said supplying means defining said first end of each unit; and
    b. a foldable web for transporting said film units in the cooperating photographic apparatus, said web being adapted when unfolded to support said film units in closely spaced succession, said web being adapted when folded in a zigzag configuration to support said film units in a superposed relationship to one another, said web including a plurality of interconnected leaders corresponding in number to said plurality of film units, each leader having first and second ends defining a second overall length greater than said first overall length, each unit being disposed in superposed relationship to a respective one of said leaders, one of said layers of each unit being separably coupled to the respective one of said leaders with which that unit is superposed, said supplying means of that unit being inseparably coupled to that leader at a first location between said first and second ends of said leader, said first end of said leader extending beyond said first end of said unit, said second end of said leader coinciding substantially with said second end of said unit, said first end of said leader being inseparably coupled to another of said leaders at a second location along the second overall length of said other leader.

2. The assemblage claimed in claim 1 wherein said unit has first and second sides, said first side being adapted for exposure to the subject, said second side being superposed upon said leader.

3. The assemblage claimed in claim 1 wherein said web is folded in said zigzag configuration so that said film units are supported in said superposed relationship.

4. The assemblage claimed in claim 1 wherein said first location on each leader is located along said second overall length of that leader a first distance from said second end of said leader substantially equal to said first overall length.

5. The assemblage claimed in claim 4 wherein said second overall length is substantially equal to but greater than twice said first overall length, said first end of said leader extending beyond said first end of said unit a second distance substantially equal to but greater than said first distance.

6. The assemblage claimed in claim 5 wherein said second location is located a third distance from said second end of said other leader substantially equal to said first distance.

7. The assemblage claimed in claim 5 wherein said second location is located a third distance from said second end of said other leader substantially equal to but greater than said first distance.

8. The assemblage claimed in claim 4 wherein said second overall length is substantially equal to but greater than one and one-half times said first overall length, said first end of said leader extending beyond said first end of said unit a second distance substantially equal to but greater than one-half said first distance.

9. The assemblage claimed in claim 8 wherein said second location on said other leader is located substantially midway between the first location on said other leader and the second end of said other leader.

10. The assemblage claimed in claim 4 wherein said supplying means of each unit includes a rupturable pod containing said processing fluid and means for directing said fluid from said pod, when ruptured, to said layers of that unit for distribution thereover, said pod being inseparably coupled to said directing means and to said leader with which said unit is superposed, said directing means being separably coupled to said layers.

11. The assemblage claimed in claim 10 wherein said unit further includes a trap for receiving and retaining any excess portion of said fluid after said distribution over said layers, said trap being separably coupled to said layers and inseparably coupled to said leader.

12. The assemblage claimed in claim 11 wherein said pod defines said first end of said unit, said trap defines said second end of said unit, said layers are disposed between said pod and said trap, and said directing means is disposed between said pod and said layers.

13. The assemblage claimed in claim 12 wherein said pod is inseparably coupled to said leader at said first location thereon, and said trap is inseparably coupled to said leader at said second end thereof.

14. A film unit assemblage for use in cooperating photographic apparatus, said assemblage comprising:
a. a plurality of film units, each unit having first and second ends defining a first overall length consisting of first and second segments, each unit including a layer of photosensitive material for establishing a developable latent image of a subject to which said photosensitive material is adapted to be exposed, a layer of image-recording material for recording a visible image in response to development of the latent image, means for permanently maintaining said layers in superposed relationship, and means for supplying to said layers a processing fluid adapted to effect development of the latent image and recording of the visible image, said supplying means being separably coupled to said layers;
b. a foldable web for transporting said film units in the cooperating photographic apparatus, said web being adapted when unfolded to support said film units in closely spaced succession, said web being adapted when folded in a zigzag configuration to support said film units in a superposed relationship to one another, said web including a main portion having a second overall length greater than the sum of the first overall lengths of said film units and a plurality of flap portions corresponding in number to said plurality of film units, said flap portions being hingedly coupled to said main portion at respective first locations spaced uniformly along said second overall length by a distance substantially equal to but greater than said first overall length, each of said flap portions having a free end defining a third overall length from the one of said first locations at which that flap portion is hingedly coupled to said main portion, said third overall length being substantially one-half said first overall length;
c. means for maintaining each film unit in superposed relationship to said web, said first and second segments of said first overall length overlying, respectively, an area of said main portion and a respective one of said flap portions; and
d. means for inseparably coupling said supplying means of each film unit to said main portion of said web at a respective one of a plurality of second locations spaced uniformly along said second overall length by said distance substantially equal to but greater than said first overall length.

15. The assemblage claimed in claim 14 wherein said first and second segments of said first overall length are substantially equal.

16. The assemblage claimed in claim 14 wherein each of said film units has first and second sides, said first side being adapted to exposure to the subject, said second side being superposed upon said web.

17. The assemblage claimed in claim 14 wherein said web is folded in said zigzag configuration so that said film units are supported in said superposed relationship.

18. The assemblage claimed in claim 14 wherein each of said flap portions has a coupled end opposite to said free end, said coupled end being inseparably coupled to said main portion at said one of said first locations, thereby hingedly coupling that flap portion to said main portion.

19. The assemblage claimed in claim 14 wherein said means for maintaining each film unit in superposed relationship to said web includes means for separably coupling one of said layers of said film unit to said area of said main portion.

20. The assemblage claimed in claim 14 wherein said means for maintaining each film unit in superposed relationship to said web includes means for separably coupling one of said layers of said film unit to said respective one of said flap portions.

21. The assemblage claimed in claim 14 wherein said supplying means includes a rupturable pod containing said processing fluid and means for directing said fluid from said pod, when ruptured, to said layers for distribution thereover, said pod being inseparably coupled to said directing means and to said main portion of said web, said directing means being separably coupled to said layers.

22. The assemblage claimed in claim 21 wherein each of said film units further includes a trap for receiving and retaining any excess portion of said fluid after said distribution over said layers, said trap being separably coupled to said layers and inseparably coupled to said respective one of said flap portions of said web.

23. The assemblage claimed in claim 22 wherein said pod defines said first end, said trap defines said second end, said layers are disposed between said pod and said trap, and said directing means is disposed between said pod and said layers.

24. The assemblage claimed in claim 23 wherein said trap is inseparably coupled to said respective one of said flap portions at said free end thereof, wherein said pod is inseparably coupled to said main portion at said respective one of said second locations, said one second location being spaced from the first location at which said one flap portion is hingedly coupled to said main portion by a distance substantially equal to said third overall length.

* * * * *

PO-1050
(5/69)

UNITED STATES PATENT OFFICE
CERTIFICATE OF CORRECTION

Patent No. __3,636,845__                 Dated __January 25, 1972__

Inventor(x) __Donald M. Harvey__

It is certified that error appears in the above-identified patent and that said Letters Patent are hereby corrected as shown below:

(Because some line numbers in the patent are not correctly registered with the lines referred to, all line numbers cited below are by actual count from the top of each column.)

In Col. 1, line 42, after "separated" insert --before and--; line 68, change "PHOTOGRAHPIC" to --PHOTOGRAPHIC--. In Col. 2, line 58, change "the" (2nd occurrence) to --of--. In Col. 3, line 25, change "net" to --next--. In Col. 4, line 6, change "to" to --of--; line 70, change "he" to --the--. In Col. 5, line 56, delete "and means" (2nd occurrence). In Col. 6, line 12, after "to" insert a comma; line 55, after "as" insert --that--; line 57 change "illustrated" to --illustrates--; line 72, change "this" to --its--; line 73, delete "and around the leading end of its film.". In Col. 7, line 1, delete "unit and extends rearwardly toward"; line 5, change "ten" to --then--; line 41, change "fied" to --fined--. In Col. 8, lines 10 and 11, delete "91, placing the cartridge into receiving chamber 83, and then closing door". In Col. 9, line 11, change "add" to --and--; line 43, delete ", spacing"; line 53, change "ing" to --es--; lines 70 and 71, delete "Thus as leader 215 is pulled away from sheets 217, 219." (1st occurrence). In Col. 10, line 72, change "now" to --not--.

UNITED STATES PATENT OFFICE
CERTIFICATE OF CORRECTION

Patent No. 3,636,845          Dated January 25, 1972

Inventor(x) Donald M. Harvey          PAGE - 2

It is certified that error appears in the above-identified patent and that said Letters Patent are hereby corrected as shown below:

In Col. 11, line 12, change "referred" to --preferred--. In Col. 12, line 1, change "this" to --its--; line 4, change "and" to --the--; line 12, change "this" to --its--; line 42, change "illustrated" to --illustrate--; line 54, change "an" to --and--. In Col. 13, line 50, change "the" (2nd occurrence) to --to--; line 63, after "of" insert --the--. In Col. 16, line 27, change "to" (first occurrence) to --for--.

Signed and sealed this 22nd day of August 1972.

(SEAL)
Attest:

EDWARD M. FLETCHER, JR.          ROBERT GOTTSCHALK
Attesting Officer                Commissioner of Patents